(12) United States Patent
Yi et al.

(10) Patent No.: US 8,160,256 B2
(45) Date of Patent: Apr. 17, 2012

(54) KEY CALCULATION METHOD AND KEY AGREEMENT METHOD USING THE SAME

(75) Inventors: Jeong Hyun Yi, Daejeon (KR); Jung Hee Cheon, Seoul (KR); Taekyoung Kwon, Seoul (KR); Mun-Kyu Lee, Bucheon-si (KR); Eunah Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1029 days.

(21) Appl. No.: 11/835,720

(22) Filed: Aug. 8, 2007

(65) Prior Publication Data

US 2008/0226083 A1    Sep. 18, 2008

(30) Foreign Application Priority Data

Mar. 16, 2007  (KR) .................. 10-2007-0026334

(51) Int. Cl.
*H04L 9/00* (2006.01)

(52) U.S. Cl. ........ 380/277; 380/280; 380/282; 380/285; 380/44; 380/45

(58) Field of Classification Search .......... 380/277–286, 380/44–47, 30; 726/20
See application file for complete search history.

(56) References Cited

U.S. PATENT DOCUMENTS

| | | | | |
|---|---|---|---|---|
| 4,935,961 A * | 6/1990 | Gargiulo et al. | ............. | 380/260 |
| 5,016,277 A * | 5/1991 | Hamilton | ............. | 713/150 |
| 5,123,047 A * | 6/1992 | Rosenow | ............. | 713/191 |
| 5,583,939 A * | 12/1996 | Chang et al. | ............. | 713/171 |
| 5,835,592 A * | 11/1998 | Chang et al. | ............. | 380/285 |
| 6,701,434 B1 * | 3/2004 | Rohatgi | ............. | 713/168 |
| 6,731,755 B1 * | 5/2004 | Cocks | ............. | 380/30 |
| 7,043,018 B1 * | 5/2006 | Kasahara et al. | ............. | 380/44 |
| 7,224,795 B2 * | 5/2007 | Takada et al. | ............. | 380/42 |
| 7,251,326 B2 * | 7/2007 | Kurdziel | ............. | 380/37 |
| 7,263,185 B2 * | 8/2007 | Fu | ............. | 380/30 |
| 7,596,227 B2 * | 9/2009 | Illowsky et al. | ............. | 380/277 |
| 7,680,270 B2 * | 3/2010 | Srungaram | ............. | 380/30 |
| 7,805,615 B2 * | 9/2010 | Narendra et al. | ............. | 713/186 |
| 7,813,512 B2 * | 10/2010 | Futa et al. | ............. | 380/285 |
| 7,889,862 B2 * | 2/2011 | Dellow et al. | ............. | 380/44 |
| 7,936,874 B2 * | 5/2011 | Futa et al. | ............. | 380/42 |
| 2002/0118830 A1 * | 8/2002 | Watanabe et al. | ............. | 380/46 |
| 2005/0251680 A1 * | 11/2005 | Brown et al. | ............. | 713/171 |
| 2006/0002562 A1 * | 1/2006 | Berenstein et al. | ............. | 380/278 |
| 2007/0230692 A1 * | 10/2007 | Akiyama et al. | ............. | 380/44 |
| 2007/0266255 A1 * | 11/2007 | Muratani | ............. | 713/176 |
| 2008/0063190 A1 * | 3/2008 | Campagna et al. | ............. | 380/44 |

FOREIGN PATENT DOCUMENTS

WO    WO 2005/018138    2/2005

OTHER PUBLICATIONS

Annie Marie Hegland, Survey of Key Management in Ad Hoc Networks, 3rd Quarter 2006, IEEE, vol. 8, pp. 48-63.*

* cited by examiner

*Primary Examiner* — Nathan Flynn
*Assistant Examiner* — Viral Lakhia
(74) *Attorney, Agent, or Firm* — NSIP Law

(57) ABSTRACT

A key calculation method and a shared key generation method, the key calculation method including: generating two keys to perform a key calculation; calculating a first value based on coefficients having an identical coefficient value among coefficients included in each of the two keys; and performing a coordinates operation or an exponentiation operation based on the first value, wherein the calculating of the first value is performed with respect to each of coefficient values included in the two keys, excluding 0.

13 Claims, 10 Drawing Sheets

110

KEY CALCULATION METHOD AND KEY AGREEMENT METHOD USING THE SAME

CROSS-REFERENCE TO RELATED APPLICATION

This application claims the benefit of Korean Patent Application No. 2007-26334, filed on Mar. 16, 2007 in the Korean Intellectual Property Office, the disclosure of which is incorporated herein by reference.

BACKGROUND

1. Field

The following description relates to a key calculation and a shared key, and more particularly, to a key calculation method to quickly perform either coordinates operation or an exponentiation operation using two keys, and a shared key generation method using the same.

2. Description of the Related Art

Many encryption schemes have been developed to secure information. For example, a Diffie-Hellman (DH) encryption scheme and an Elliptic Curve Cryptography (ECC) scheme are utilized to more effectively secure information.

In particular, the DH encryption scheme utilizes an exponentiation operation for an encryption process. In addition to the DH encryption scheme, there are many encryption schemes that utilize the exponentiation operation. In the DH encryption scheme, the length of a key (which is an exponent in the exponentiation operation) must be increased by a predetermined length for more stable information security. However, when the length of the key is increased, a magnitude of the exponentiation operation also increases, resulting in a decreased calculation speed. The decrease in the calculation speed more frequently occurs in a mobile device with limited processor capabilities.

Furthermore, the ECC scheme utilizes a coordinates add operation for an encryption process. In the case of the ECC scheme, the length of a key (which is a coefficient to be multiplied by coordinates in the coordinates add operation) also needs to be increased by a predetermined length for more stable information security. However, when the length of the key is increased, a magnitude of the coordinates add operation also increases, resulting in a decreased calculation speed. As in the ECC scheme, the decrease in the calculation speed more frequently occurs in a mobile device with limited processor capabilities.

Also, the greater the magnitude of the operation (exponentiation operation or coordinates add operation), the more memory is used. Accordingly, there is a need for a method that can quickly perform an operation with a relatively small amount of memory.

SUMMARY

General aspects provide an apparatus and method to perform either a coordinates operation or an exponentiation operation using two keys to thereby maintain security and improve a calculation processing speed with a relatively small amount of memory.

General aspects also provide an apparatus and method to generate a shared key through a key calculation function using two secret keys and two received public keys.

In a general aspect, there is provided a method of calculating a key, the method including: generating two keys; calculating one or more first values based on coefficients having an identical coefficient value among coefficients included in each of the two keys, such that a first value is calculated for each of the coefficient values, excluding 0; and performing a coordinates operation or an exponentiation operation based on the first value.

Each of the two keys may include at most one coefficient, excluding 0, among a consecutive w number of coefficients, the at most one coefficient being an integer that has an absolute value of less than or equal to $q^w/2$ and is indivisible by q, q may be a prime number or a power exponent of the prime number, w may be a natural number greater than or equal to 2, and the key calculation method may perform the coordinates operation based on the one or more first values.

Each of the two keys may include at most one coefficient, excluding 0, among a consecutive w number of coefficients, the at most one coefficient being either 0 or a positive odd number less than or equal to $2^w$, and w may be a natural number greater than or equal to 2, and the key calculation method may perform the exponentiation operation by using the one or more first values as exponents.

The generating of the two keys may split a calculation target key to generate the two keys, and a number of the coefficients, excluding 0, among the coefficients included in each of the two keys may be less than a number of coefficients, excluding 0, among coefficients included in the calculation target key.

The generating of the two keys may select the two keys from a predetermined group of keys.

According to another general aspect, there is provided a method of generating a shared key, the method including: generating two secret keys; calculating a first public key based on the two secret keys; calculating a second public key based on the first public key; transmitting the first public key and the second public key, and receiving a third public key and a fourth public key; and generating the shared key based on the two secret keys, the third public key, and the fourth public key.

Each of the two keys may include at most one coefficient, excluding 0, among a consecutive w number of coefficients, the at most one coefficient being an integer that has an absolute value of less than or equal to $q^w/2$ and is indivisible by q, q may be a prime number or a power exponent of the prime number, and w may be a natural number greater than or equal to 2.

The calculating of the first public key may include: calculating one or more first values based on coefficients having an identical coefficient value among coefficients included in each of the two secret keys, such that a first value is calculated for each of the coefficient values, excluding 0; and calculating the first public key by performing a coordinates operation based on the one or more first values.

Each of the two secret keys may include at most one coefficient, excluding 0, among a consecutive w number of coefficients, the at most one coefficient being either 0 or a positive odd number less than or equal to $2^w$, and w may be a natural number greater than or equal to 2.

The calculating of the first public key may include: calculating one or more first values based on coefficients having an identical coefficient value among coefficients included in each of the two secret keys, such that a first value is calculated for each of the coefficient values, excluding 0; and calculating the first public key by performing an exponentiation operation using the one or more first values as exponents.

According to still another general aspect, there is provided an apparatus for calculating a key, the apparatus including: a key generation management unit to generate two keys; a coefficient value calculator to calculate one or more first values based on coefficients having an identical coefficient value among coefficients included in each of the two keys, such that a first value is calculated for each of the coefficient values, excluding 0; and a key calculator to perform a coordinates operation or an exponentiation operation based on the one or more first values.

According to yet another general aspect, there is provided an apparatus for generating a shared key, the apparatus including: a key generation management unit to generate two secret keys; a first calculator to calculate a first public key based on the two secret keys; a second calculator to calculate a second public key based on the first public key; a transmitting and receiving unit to transmit the first public key and the second public key, and receive a third public key and a fourth public key; and a shared key generator to generate the shared key based on the two secret keys, the third public key, and the fourth public key.

According to another general aspect, there is provided a system for securing transactions between apparatuses, the system including: a first apparatus that generates a first shared key based on two first secret keys, a third public key, and a fourth public key; and a second apparatus that generates a second shared key based on two second secret keys, a first public key, and a second public key, wherein the first public key is calculated based on the two first secret keys, the second public key is calculated based on the first public key, the third public key is calculated based on the two second secret keys, the fourth public key is calculated based on the second public key, and a transaction between the first apparatus and the second apparatus is secure if the first shared key is identical to the second shared key.

Additional aspects and/or features will be set forth in part in the description which follows and, in part, will be obvious from the description, or may be learned by practice.

BRIEF DESCRIPTION OF THE DRAWINGS

These and/or other aspects and features will become apparent and more readily appreciated from the following detailed description, taken in conjunction with the accompanying drawings of which.

DETAILED DESCRIPTION OF THE EMBODIMENTS

Figure 1:
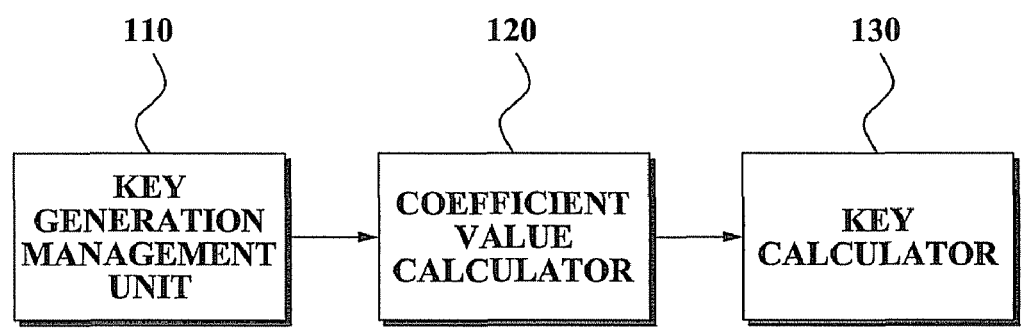
FIG. 1 is a block diagram illustrating an example of a key calculation apparatus.

Reference will now be made in detail to general aspects, examples of which are illustrated in the accompanying drawings, wherein like reference numerals refer to the like elements throughout. The examples are described below in order to explain general aspects by referring to the figures.

FIG. 1 is a block diagram illustrating an example of a key calculation apparatus. Referring to FIG. 1, the key calculation apparatus includes a key generation management unit 110, a coefficient value calculator 120, and a key calculator 130.

The key generation management unit 110 generates two keys to perform a key calculation. For example, the key generation management unit 110 may randomly select two keys from a predetermined group of keys and thereby generate two keys to perform the key calculation.

In the case of an elliptic curve, the key generation management unit 110 may generate two $\tau$-adic width-Non Adjacent Form (w-NAF) keys. $\tau$-adic w-NAF indicates a form in which $\tau$ is combined with NAF. $\tau$ indicates $(x,y) \rightarrow (x^q, y^q)$, which is a Frobenius endomorphism map. Moreover, a w-NAF key is a key that includes at most one coefficient, excluding 0, among a consecutive w number of coefficients. The at most one coefficient corresponds to an odd number that has an absolute value of less than or equal to $2^{w-1}$, excluding 0, among coefficients of the w-NAF key. Also, w indicates a natural number greater than or equal to 2.

For example, the $\tau$-adic w-NAF key indicates a key that includes at most one coefficient, excluding 0, among a consecutive w number of coefficients. In this instance, the at most one coefficient corresponds to an integer that has an absolute value of less than or equal to $q^w/2$ and is indivisible by q, excluding 0, among coefficients of the $\tau$-adic w-NAF key. q indicates either a prime number or a power exponent of the prime number.

In the case of a finite field, the key generation management unit 110 may generate two unsigned w-NAF keys. The unsigned w-NAF key is a key that includes at most one coefficient, excluding 0, among a consecutive w number of coefficients. The at most one coefficient corresponds to a positive odd number less than or equal to $2^w$, excluding 0, among coefficients of the unsigned w-NAF key.

Furthermore, the key generation management unit 110 may receive an operation target key, split the received operation target key, and thereby generate two keys corresponding to the operation target key. A number of the coefficients, excluding 0, among the coefficients included in each of the two keys corresponding to the operation target key may be less than a number of coefficients, including 0, among coefficients included in the calculation target key. For example, when performing the key calculation, the key generation management unit 110 may generate two keys that include a number of coefficients, excluding 0, less than a number of coefficients, including 0, among coefficients included in the operation target key, in order to reduce a key calculation time.

The coefficient value calculator 120 calculates a first value based on coefficients having an identical coefficient value among coefficients included in each of the two keys generated by the key generation management unit 110. In this instance, the coefficient value calculator 120 calculates the first value with respect to each coefficient value included in the two keys, excluding 0. Thus, the coefficient value calculator 120 calculates a plurality of first values. For example, the coefficient value calculator 120 calculates the first value based on coefficient values included in two $\tau$-adic w-NAF keys selected in the case of the elliptic curve, or two $\tau$-adic w-NAF keys corresponding to the calculation target key. Also, the coefficient value calculator 120 calculates the first value based on coefficient values included in two unsigned w-NAF keys selected in the case of the finite field or two unsigned w-NAF keys corresponding to the calculation target key.

The key calculator 130 performs either a coordinates operation or an exponentiation operation based on the first values calculated by the coefficient value calculator 120. The key calculator 130 performs the coordinates operation based on the calculated first values or performs the exponentiation operation using the calculated first values as an exponent.

For example, in the case of the elliptic curve, when it is assumed that two τ-adic w-NAF keys are $k=(k_{m-1}, k_{m-2}, \ldots, k_0)$ and $l=(l_{m-1}, l_{m-2}, \ldots, l_0)$, and inputted elliptic curve points are P and Q, the key calculator 130 calculates elliptic curve point T as kP +lQ, where k and l are keys and m indicates a location of a term. Hereinafter, a process of calculating T using the key calculator 130 will be described. A term having a coefficient value as either 1 or −1 is detected from keys k and l sequentially with respect to terms from 0 to m−1. An added value with respect to the term having the coefficient value as either 1 or −1 is stored in a register with respect to coefficient value 1. added value of the term having the coefficient value as either 1 or −1 with respect to the keys k and l is stored in register R[1]. For example, when it is assumed that terms 3 and m−1 have the coefficient value as either 1 or −1 in the key k, and terms 2 and m−2 have the coefficient value as either 1 or −1 in the key l, a value that is stored in register R[1] (i.e., the first value with respect to the coefficient value 1 or −1) is $sign(1_2)*\tau^2(P)+sign(k_3)*\tau^3(P)+sign(1_{m-2})*\tau^{m-2}(P)+sign(k_{m-1})*\tau^{m-1}(P)$. Sign(x) is a function to indicate a sign of x. Thus, sign(x)=1 when x is a positive number, sign(x)=−1 when x is a negative number, and sign(x)=0 when x is 0.

The above process is sequentially repeated with respect to coefficient values $\pm 1, \pm 3, \ldots, \pm 2^{w-1}-1$. A first value with respect to each of the coefficient values is calculated, and the calculated first values constitute the elliptic curve point T through an add operation using values from $R[2^{w-1}-1]$ to R[1].

As described above, an example of a key calculation method may reduce a number of add operations and may also improve an add operation processing speed in a system with a relatively small amount of memory. For example, the add operation processing speed, which requires only a relatively large amount of memory in the related art, can be acquired by using a relatively small amount of memory.

Figure 2:
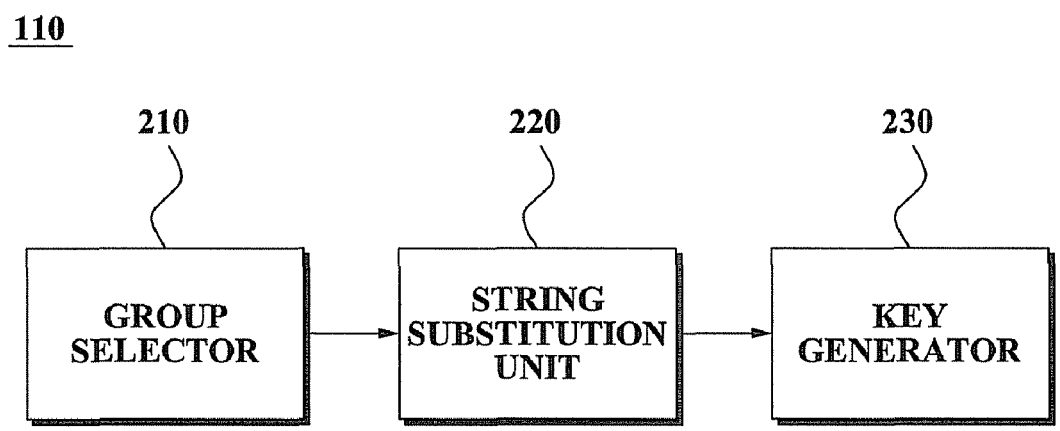
FIG. 2 is a block diagram illustrating an example of a key generation management unit of FIG. 1.

FIG. 2 is a block diagram illustrating an example of the key generation management unit 110 of FIG. 1. Referring to FIG. 2, the key generation management unit 110 includes a group selector 210, a string substitution unit 220, and a key generator 230. Specifically, the key generation management unit 110 generates two τ-adic w-NAF keys or two unsigned w-NAF keys using the group selector 210, the string substitution unit 220, and the key generator 230.

In the case of the elliptic curve, the group selector 210 selects a t number of groups from an m−(w−1)*(t−1) number of groups, where m and t indicate positive integers. In the case of the finite field, the group selector 210 selects a t number of groups from an m−(w−1)*t number of groups, where m and t indicate positive integers.

In the case of the elliptic curve, the string substitution unit 220 substitutes each of the selected t number of groups with a string. The string lists a w−1 number of 0s and any number of integers that have an absolute value of less than or equal to $q^w/2$ and are indivisible by q. The number of integers that have the absolute value of less than or equal to $q^w/2$ and are indivisible by q may be listed after the w−1 number of 0s. In the case of the finite field, the string substitution unit 220 substitutes each of the selected t number of groups with a string. The string lists a w−1 number of 0s and any number of positive odd numbers less than or equal to $2^w$. Any number of the positive odd numbers less than or equal to $2^w$ may be listed after the w−1 number of 0s.

In the case of the elliptic curve, the key generator 230 substitutes an unselected group with 0, and thereby generates the τ-adic w-NAF key. In the case of the finite field, the key generator 230 substitutes an unselected group with 0, and thereby generates the unsigned w-NAF key.

Figure 3:
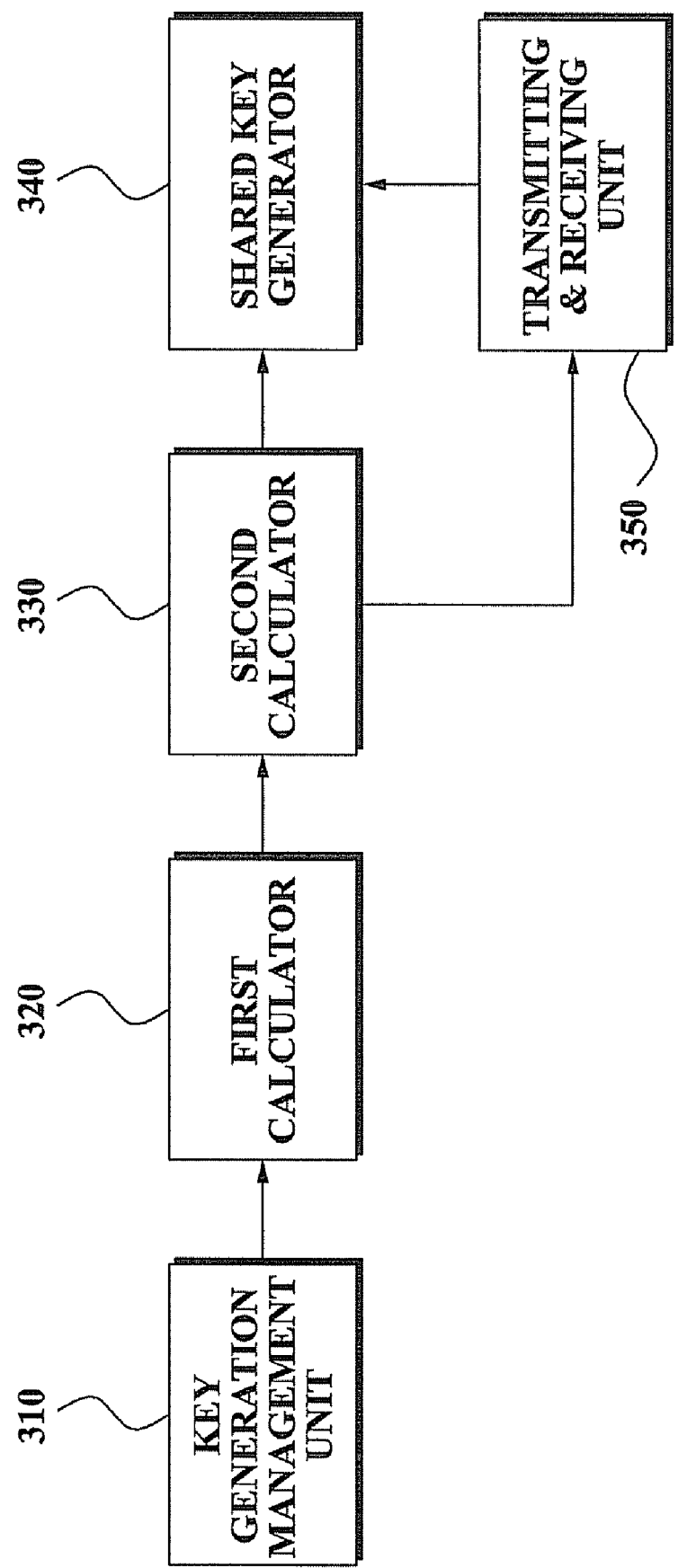
FIG. 3 is a block diagram illustrating an example of a shared key generation apparatus.

FIG. 3 is a block diagram illustrating an example of a shared key generation apparatus Referring to FIG. 3, the shared key generation apparatus includes a key generation management unit 310, a first calculator 320, a second calculator 330, a shared key generator 340, and a transmitting and receiving unit 350.

The key generation management unit 310 generates two secret keys. Alternatively, the key generation management unit 310 may select two secret keys from a group of secret keys. For example, in the case of an elliptic curve, the key generation management unit 310 may generate two τ-adic w-NAF secret keys. Each of the two secret keys includes at most one coefficient, excluding 0, among a consecutive w number of coefficients. The at most one coefficient corresponds to an integer that has an absolute value of less than or equal to $q^w/2$ and is indivisible by q.

In the case of a finite field, the key generation management unit 310 may generate two unsigned w-NAF keys. For example, the generation management unit 310 generates two unsigned w-NAF keys that include at most one coefficient, excluding 0, among a consecutive w number of coefficients. The at most one coefficient corresponds to a positive odd number less than or equal to $2^w$, excluding 0, among coefficients of the unsigned w-NAF key.

The first calculator 320 calculates a first public key based on the two secret keys generated by the key generation management unit 310. For example, in the case of the elliptic curve, the first public key may be calculated by:

$$X[i]=x[i]\times P+y[i]\times Q,$$ [Equation 1]

where X[i] indicates the first public key, x[i] and y[i] indicate the secret keys, and P and Q indicate the inputted elliptic curve points. The relationship between P and Q may be expressed as Q=αP in which α may indicate a randomly selected value.

Furthermore, in the case of the elliptic curve, a process of calculating the first public key using two secret keys may be the same as the key calculation process performed by the coefficient value calculator 120 and the key calculator 130 illustrated in FIG. 1. For example, the first calculator 320 calculates a first value based on coefficients having an identical coefficient value among coefficients included in each of the two secret keys, and calculates the first public key by performing a coordinates operation based on the first value. The first calculator 320 may calculate the first value with respect to each of the coefficient values included in the two secret keys, excluding 0.

In the case of the finite field, the first calculator 320 calculates a first value based on coefficients having an identical coefficient value among coefficients included in each of the two secret keys, and calculates the first public key by performing an exponentiation operation using the first value as an exponent. The first calculator 320 may calculate the first value with respect to each of coefficient values included in the two secret keys, excluding 0.

The second calculator 330 calculates a second public key based on the first public key calculated by the first calculator 320. For example, in the case of the elliptic curve, the second public key may be calculated by:

$$Y[i]=\alpha \times X[i],\qquad\text{[Equation 2]}$$

where Y[i] indicates the second public key, X[i] indicates the first public key, and α indicates the randomly selected value. α indicates a value which satisfies Q=αP with respect to the inputted elliptic curve points P and Q.

The transmitting and receiving unit 350 transmits the first public key and the second public key, and receives a third public key and a fourth public key. The transmitting and receiving unit 350 may, although not necessarily, transmit the first public key and the second public key to an apparatus that transmits the third public key and the fourth public key. The third public key and the fourth public key correspond to the first public key and the second public key, respectively.

For example, when a first apparatus, between two apparatuses to generate a shared key, generates the first public key and the second public key, and a second apparatus generates the third public key and the fourth public key, the first apparatus receives the third public key and the fourth public key from the second apparatus. Moreover, the second apparatus receives the first public key and the second public key from the first apparatus.

The shared key generator 340 generates a shared key based on the two secret keys generated by the key generation management unit 310, the third public key, and the fourth public key. For example, in the case of the elliptic curve, the shared key may be generated by:

$$K=x[i]\times X[j]+y[i]\times Y[j],\qquad\text{[Equation 3]}$$

where K indicates the shared key, x[i] and y[i] indicate the secret keys, and X[j] and Y[j] indicate the third public key and the fourth public key.

Figure 4:
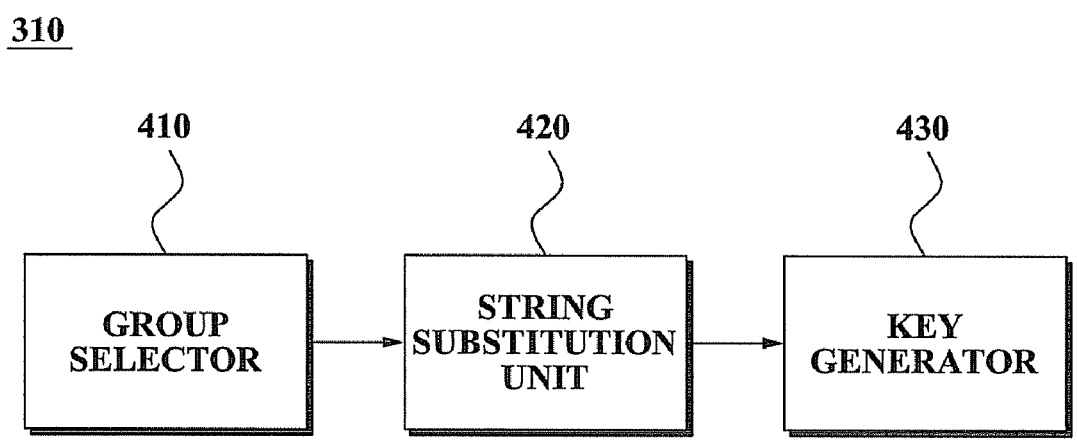
FIG. 4 is a block diagram illustrating an example of a key generation management unit of FIG. 3.

FIG. 4 is a block diagram illustrating an example of the key generation management unit 310 of FIG. 3. Referring to FIG. 4, the key generation management unit 310 includes a group selector 410, a string substitution unit 420, and a key generator 430. Specifically, the key generation management unit 310 generates two τ-adic w-NAF keys or two unsigned w-NAF keys using the group selector 410, the string substitution unit 420, and the key generator 430

In the case of the elliptic curve, the group selector 410 selects a t number of groups from an m−(w−1)*(t−1) number of groups, where m and t are positive integers. In the case of the finite field, the group selector 410 selects a t number of groups from an m−(w−1)*t number of groups, where m and t are positive integers.

In the case of the elliptic curve, the string substitution unit 420 substitutes each of the selected t number of groups with a string. The string lists a w−1 number of 0s and any number of integers that have an absolute value of less than or equal to $q^w/2$ and are indivisible by q. In the case of the finite field, the string substitution unit 420 substitutes each of the selected t number of groups with a string. The string lists a w−1 number of 0s and any number of positive odd numbers less than or equal to $2^w$.

In the case of the elliptic curve, the key generator 430 substitutes an unselected group with 0, and thereby generates the τ-adic w-NAF key. In the case of the finite field, the key generator 430 substitutes an unselected group with 0, and thereby generates the unsigned w-NAF key.

Figure 5:
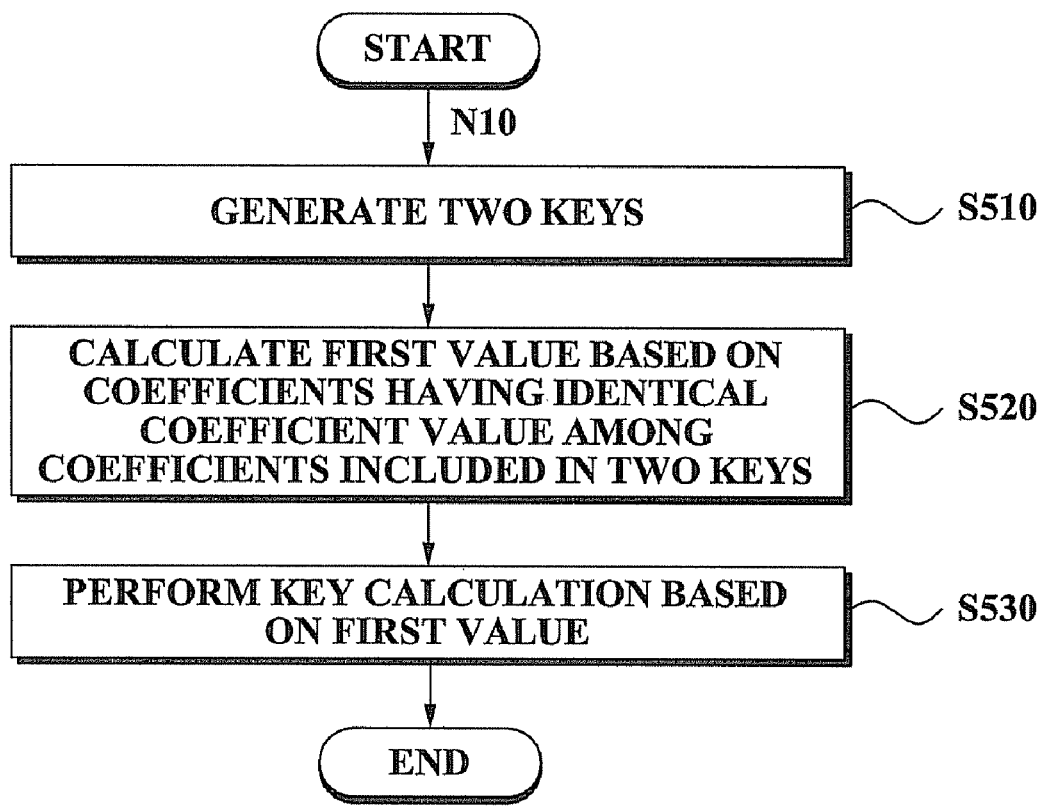
FIG. 5 is a flowchart illustrating an example of a method of calculating a key.

FIG. 5 is a flowchart illustrating an example of a method of calculating a key. Referring to FIG. 5, first, two keys are generated to perform a key calculation in operation S510. For example, the two keys to perform the key calculation may be generated by splitting a calculation target key. Furthermore, a number of the coefficients, excluding 0, among the coefficients included in each of the two keys may be less than a number of coefficients, excluding 0, among coefficients included in the calculation target key in order to quickly perform the key calculation. Furthermore, the two keys may be two τ-adic w-NAF keys in the case of an elliptic curve, and may be two unsigned w-NAF keys in the case of a finite field.

Next, a first value based on coefficients having an identical coefficient value among coefficients included in the two keys is calculated in operation S520. The calculating of the first value is performed with respect to each of the coefficient values included in the two keys, excluding 0. For example, the calculating of the first value is based on coefficient values included in two τ-adic w-NAF keys selected in the case of the elliptic curve or two τ-adic w-NAF keys corresponding to the calculation target key. Moreover, the calculating of the first value is based on coefficient values included in two unsigned w-NAF keys selected in the case of the finite field or two unsigned w-NAF keys corresponding to the calculation target key.

After the first value is calculated (operation S520), the key calculation is performed based on the first value in operation S530. For example, either a coordinates operation or an exponentiation operation based on the first values is performed.

Figure 6:
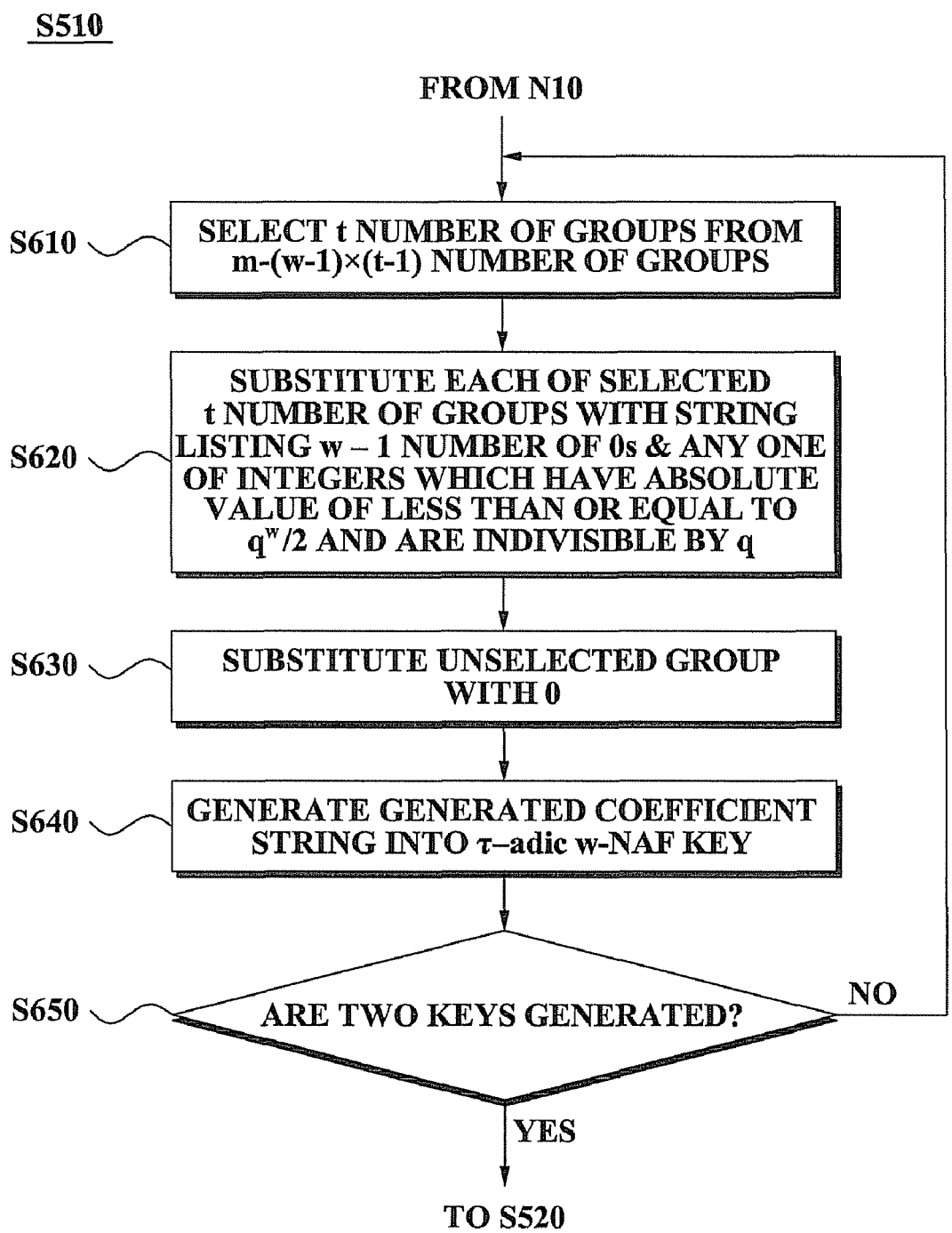
FIG. 6 is a flowchart illustrating an example of a process of generating two keys in operation S510 of FIG. 5.

FIG. 6 is a flowchart illustrating an example of the generating of two keys in operation S510 of FIG. 5. For example, FIG. 6 is a flowchart illustrating a process of generating two keys in the case of the elliptic curve. Referring to FIG. 6, in operation S610, a t number of groups is selected from an m−(w−1)*(t−1) number of groups, where m indicates an integer associated with a number of coefficients of a τ-adic w-NAF key to be generated, w indicates a positive integer greater than or equal to 2 corresponding to a number of coefficients of the selected group, and t indicates a positive integer corresponding to a number of coefficients, excluding 0, among coefficients of the τ-adic w-NAF key.

When the t number of groups is selected (operation S610), each of the selected t number of groups is substituted with a string in operation S620. The string lists a w−1 number of 0s and any number of integers that have an absolute value of less than or equal to $q^w/2$ and are indivisible by q. The substituted string may be a string that is generated by listing any number of integers, which have an absolute value of less than or equal to $q^w/2$ and are indivisible by q, after the w−1 number of 0s. An unselected group is substituted with 0 in operation S630.

A coefficient string, generated through operations S620 and S630, is generated into the τ-adic w-NAF key in operation S640.

Whether two keys are generated is determined in operation S650. If two keys are not generated (operation S650), operations S610 through S640 are repeated until two τ-adic w-NAF keys are generated.

Figure 7:
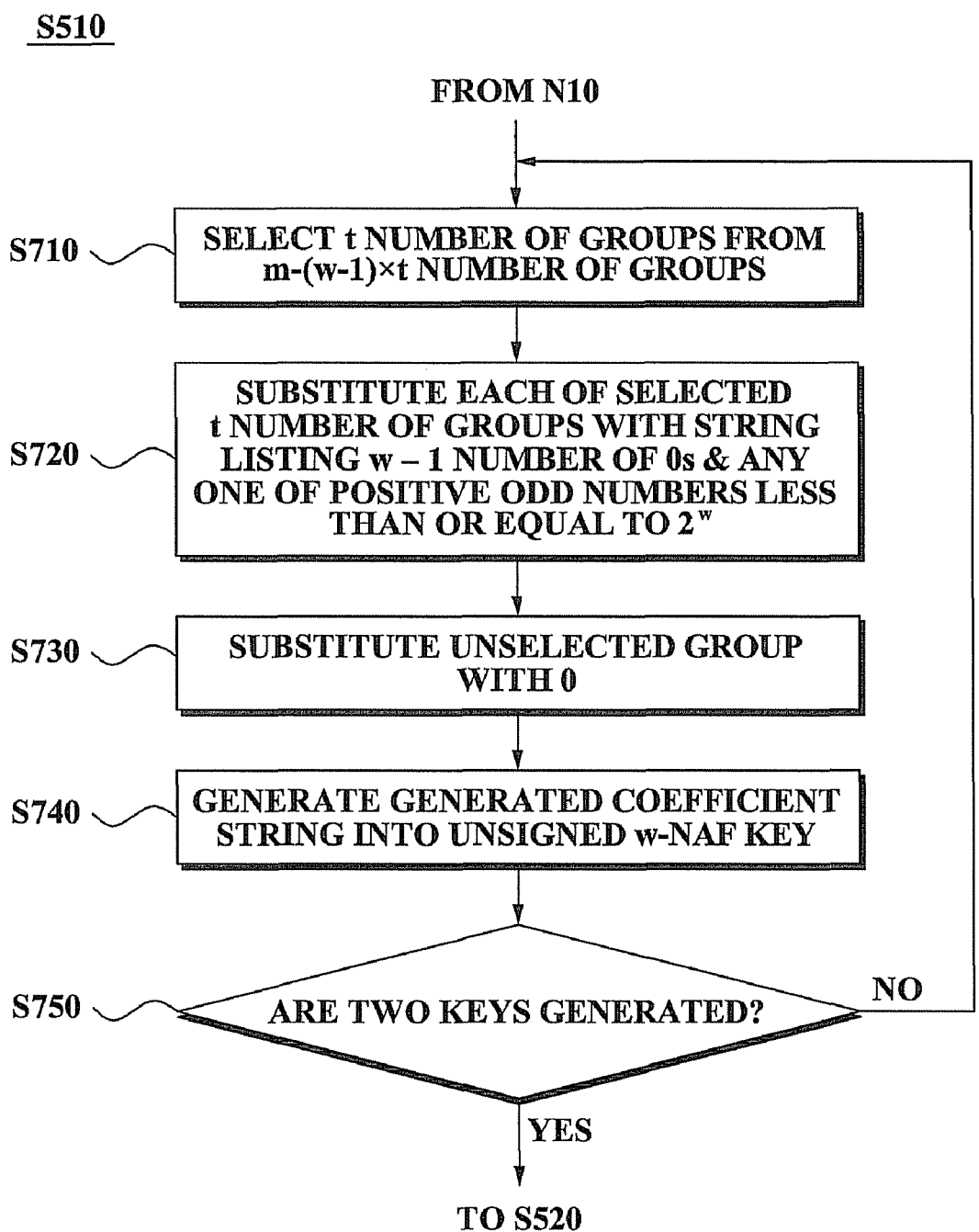
FIG. 7 is a flowchart illustrating another example of a process of generating two keys in operation S510 of FIG. 5.

FIG. 7 is a flowchart illustrating an example of operation the generating of two keys in operation S510 of FIG. 5. FIG. 7 is a flowchart illustrating a process of generating two keys in the case of the finite field. Referring to FIG. 7, in operation S710, a t number of groups are selected from an m−(w−1)*t number of groups, where m indicates an integer associated with a number of coefficients of an unsigned w-NAF key to be generated, w indicates a positive integer greater than or equal to 2 corresponding to a number of coefficients of the selected group, and t indicates a positive integer corresponding to a number of coefficients, excluding 0, among coefficients of the unsigned w-NAF.

When the t number of groups is selected, each of the selected t number of groups is substituted with a string in operation S720. The string lists a w−1 number of 0s and any number of positive odd numbers less than or equal to $2^w$. An unselected group is substituted with 0 in operation S730.

A coefficient string, generated through operations S720 and S730, is generated into the unsigned w-NAK key in operation S740.

Whether two keys are generated is determined in operation S750. If two keys are not generated (operation S750), operations S710 through S740 are repeated until two unsigned w-NAK keys are generated.

Figure 8:
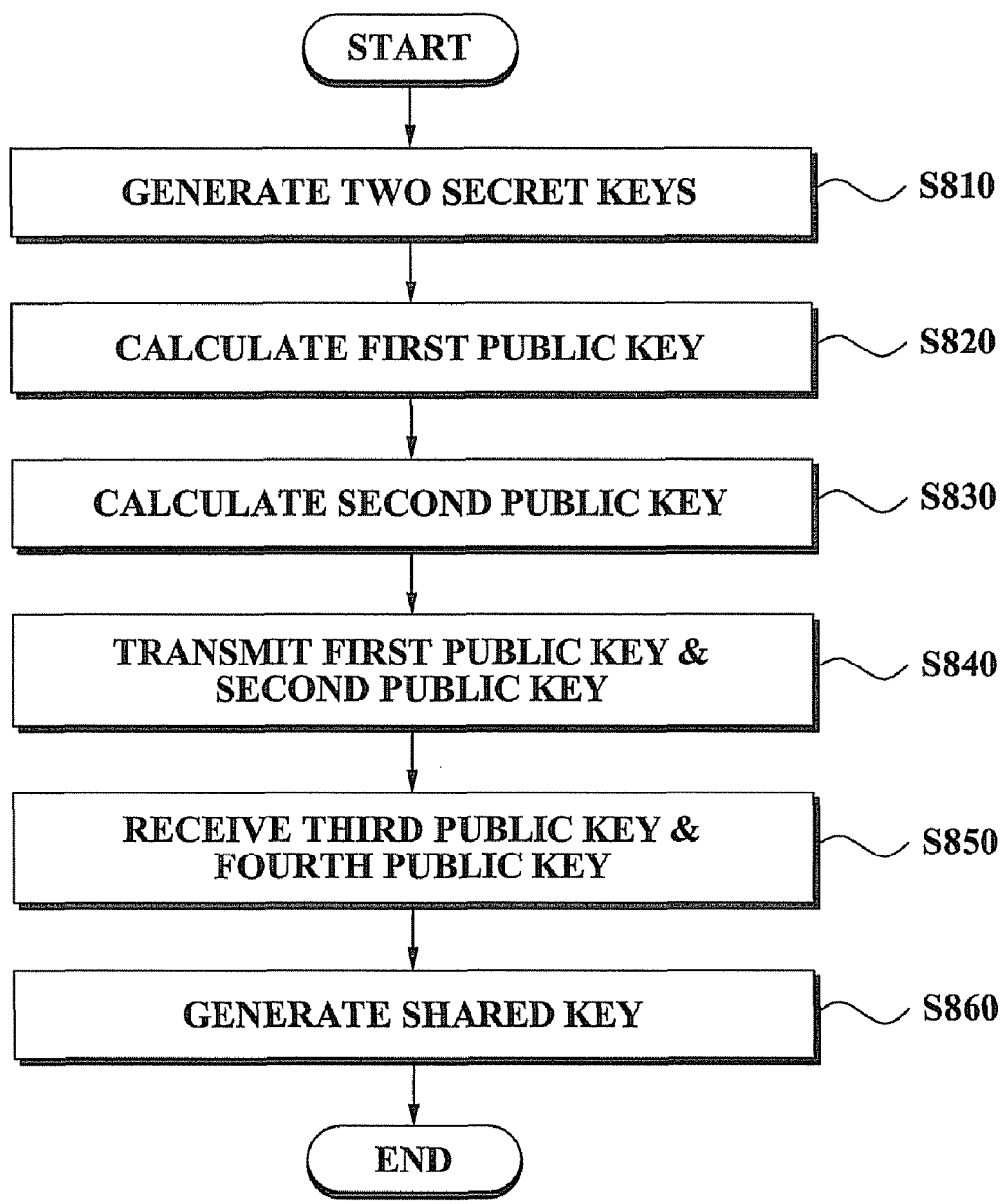
FIG. 8 is a flowchart illustrating an example of a method of generating a shared key.

FIG. 8 is a flowchart illustrating an example of a method of generating a shared key Referring to FIG. 8, in operation S810, the shared key generation method generates two secret keys. Alternatively, the two secret keys may be selected from a group of secret keys. Also, the two keys may be two τ-adic w-NAF keys in the case of the elliptic curve, or may be two unsigned w-NAF keys in the case of the finite field.

Next, the shared key generation method calculates a first public key based on the two secret keys in operation S820. For example, in the case of the elliptic curve, the first public key may be calculated by Equation 1 described above with reference to FIG. 3. The first public key is calculated by using elliptic curve points P and Q, and the generated two τ-adic w-NAF keys. In this instance, the relationship between the elliptic curve points P and Q is expressed as Q=αP in which α may indicate a randomly selected value.

Furthermore, in the case of the elliptic curve, the first public key may be acquired by calculating a first value based on coefficients having an identical coefficient value among coefficients included in each of the two secret keys, and performing a coordinates operation based on the first value. In this instance, the calculation of the first value may be performed with respect to each of the coefficient values included in the two secret keys, excluding 0.

In the case of the finite field, the first public key may be acquired by calculating a first value based on coefficients having an identical coefficient value among coefficients included in each of the two secret keys, and performing an exponentiation operation using the first value as an exponent. In this instance, the calculating of the first value may be performed with respect to each of coefficient values included in the two secret keys, excluding 0.

When the first public key is calculated (operation S820), the shared key generation method calculates a second public key based on the first public key in operation S830. The second public key may be calculated based on the first public key and the randomly selected value α. For example, in the case of the elliptic curve, the second public key may be calculated by Equation 2 described above with reference to FIG. 3.

When the second public key is calculated (operation S830), the first public key and the second public key are transmitted to another apparatus to generate a shared key together in operation S840. For example, when a first apparatus and a second apparatus generate a shared key for transactions between the first apparatus and the second apparatus, and the first apparatus calculates the first public key and the second public key, the first apparatus transmits the generated first public key and the second public key to the second apparatus.

In operation S850, a third public key and a fourth public key that are calculated and transmitted from another apparatus (such as the second apparatus) are received. The third public key and the fourth public key correspond to the first public key and the second public key, respectively.

In operation S860, a shared key based on the two secret keys, the third public key, and the fourth public key is generated. For example, in the case of the elliptic curve, the shared key may be generated by Equation 3 described above with reference to FIG. 3.

Figure 9:
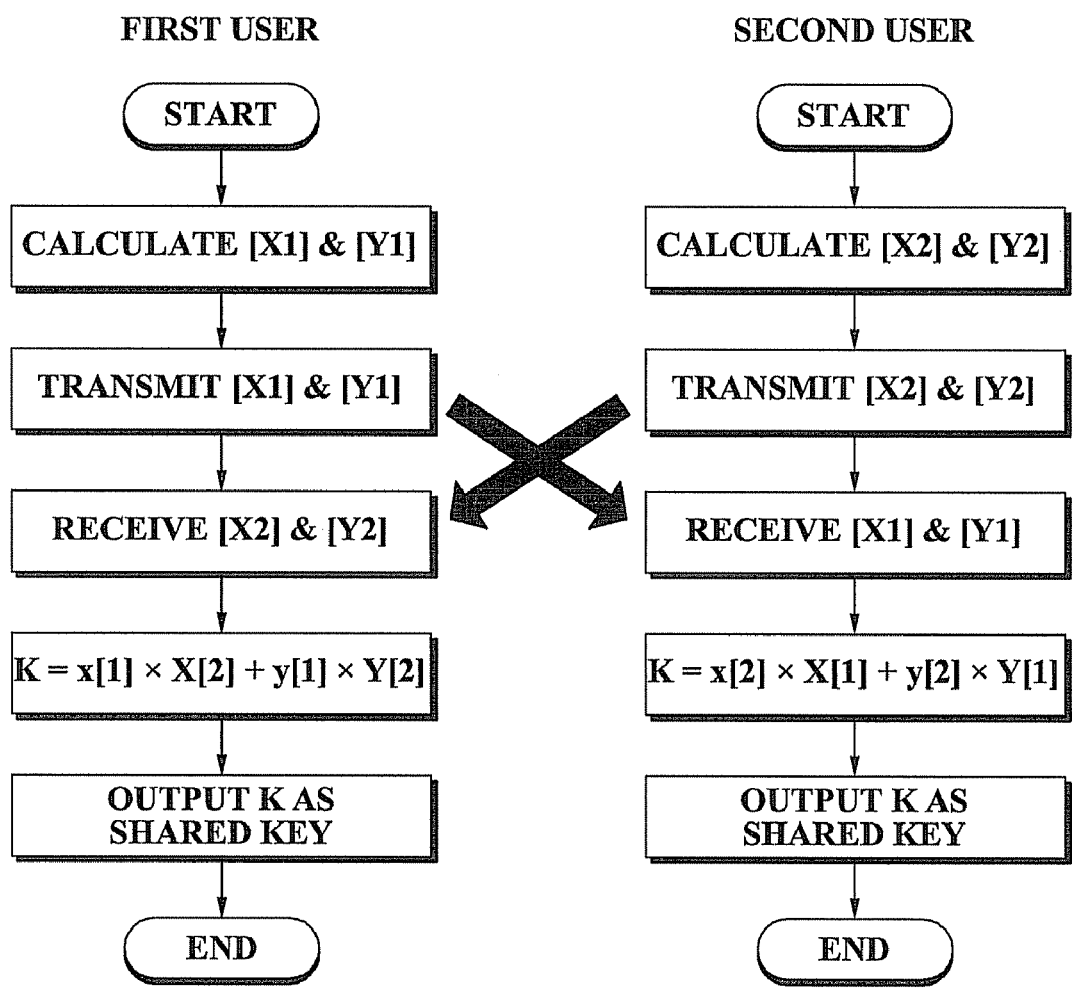
FIG. 9 illustrates an example to describe a method of generating a shared key.

Hereinafter, an example of a method of generating a shared key will be further described with reference to FIG. 9. FIG. 9 illustrates an example to describe a method of generating a shared key. For example, FIG. 9 illustrates a process of generating a shared key for safe online transactions between two users in the case of the elliptic curve.

Referring to FIG. 9, a shared key generation apparatus of each of a first user and a second user generates two secret keys. For example, a shared key generation apparatus of the first user (hereinafter, referred to as a first apparatus) generates two secret keys x[1] and y[1]. Furthermore, a shared key generation apparatus of the second user (hereinafter, referred to as a second apparatus) generates two secret keys x[2] and y[2].

The first apparatus calculates public keys X[1] and Y[1] based on the secret keys x[1] and y[1], and transmits the calculated public keys X[1] and Y[1] to the second apparatus. The second apparatus calculates public keys X[2] and Y[2] based on the secret keys x[2] and y[2], and transmits the calculated public keys X[2] and Y[2] to the first apparatus.

The first apparatus receives the public keys X[2] and Y[2] from the second apparatus, and generates a shared key K based on the secret keys x[1] and y[1], and the public keys X[2] and Y[2]. For example, the shared key K generated by the first apparatus is x[1]X[2]+y[1]Y[2]. When the shared key K generated by the first apparatus is identical to a shared key generated by the second apparatus, the first user and the second user are regarded as secured users and thereby safe online transactions may be enabled.

According to the above teachings, when α is unpublished, the secret keys, the first public key, and the second public key may be received from a third apparatus, which maintains α as secret information, rather than generated from each of the first apparatus and the second apparatus. In this case, the first calculator 320 and the second calculator 330 illustrated FIG. 3, operations S810 through S830 illustrated in FIG. 8, and the calculation of X[1] and Y[1] by the first user and X[2] and Y[2] by the second user illustrated in FIG. 9 may be omitted.

Figure 10:
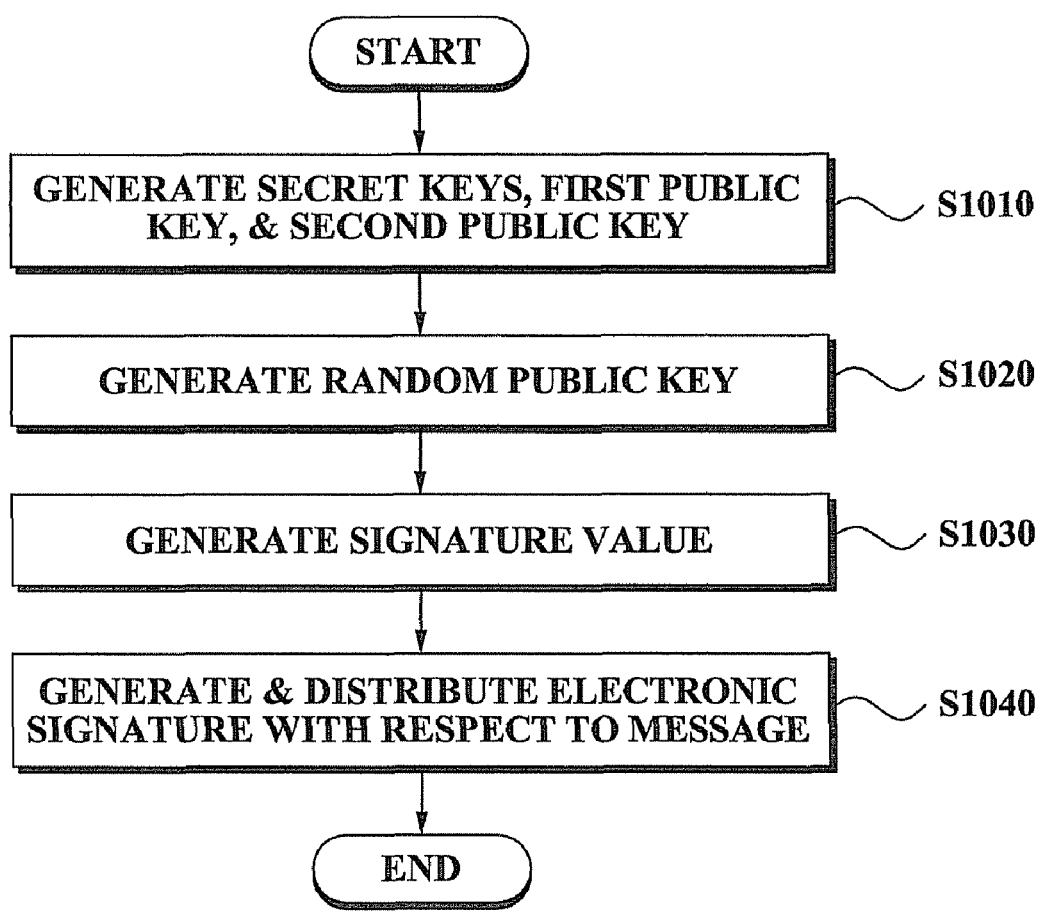
FIG. 10 is a flowchart illustrating an example of a method of generating and distributing an electronic signature.
Figure 11:
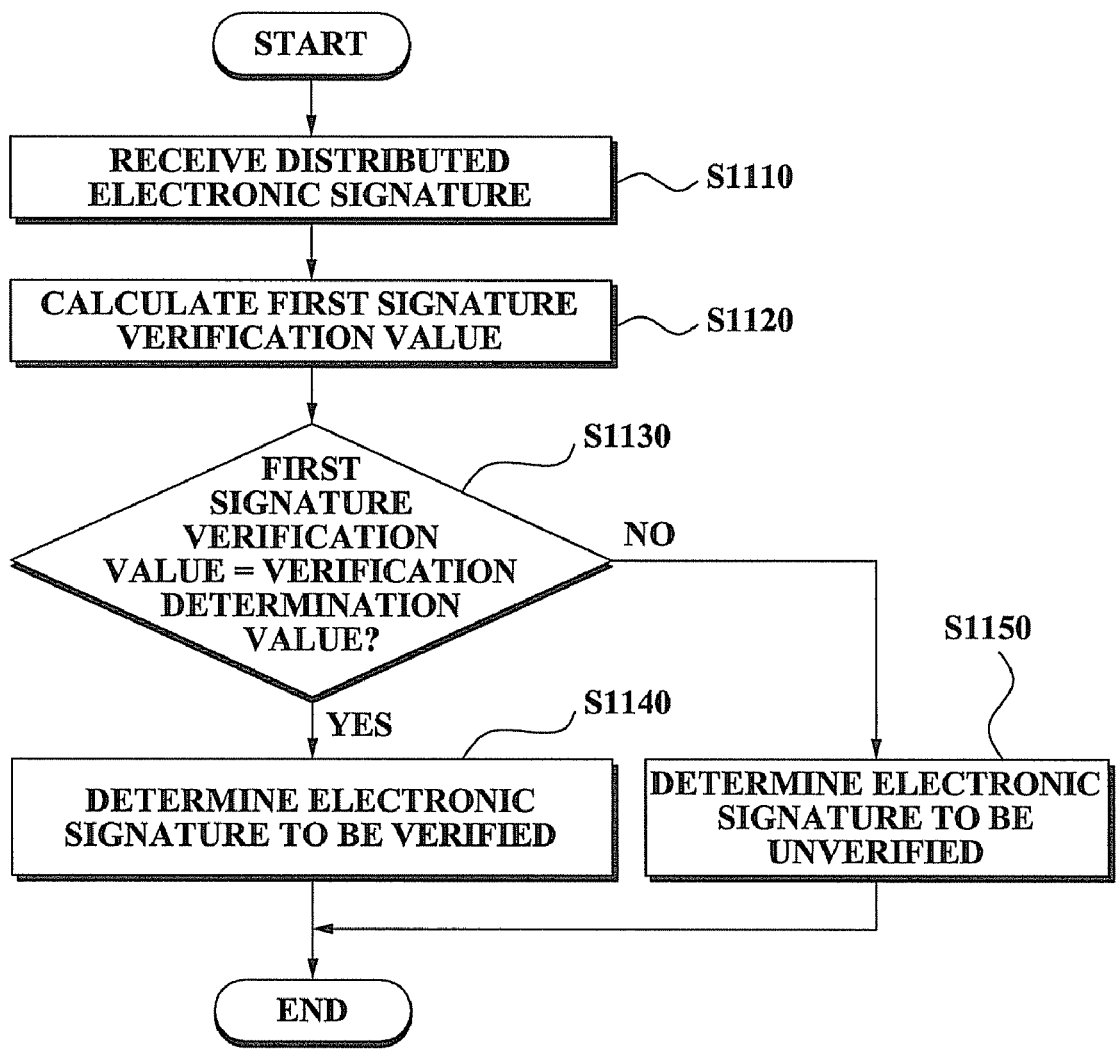
FIG. 11 is a flowchart illustrating an example of a method of receiving and verifying a distributed electronic signature.

FIGS. 10 and 11 are flowcharts illustrating an example of applying a key calculation method where the key calculation method is applied to an electronic signature. Hereinafter, in the case of the elliptic curve, the electronic signature will be described.

FIG. 10 is a flowchart illustrating an example of a method of generating and distributing an electronic signature. In operation S1010, secret keys, a first public key, and a second public key are generated in order to generate the electronic signature.

For examples, two τ-adic w-NAF keys may be generated as secret keys x and y. Then, the first public key X and the second public key Y are generated or calculated by using the secret keys x and y. In this instance, the first public key X and the second public key Y may be calculated by:

$$X=(x+\alpha y)P$$

$$Y=\alpha X, \quad \text{[Equation 4]}$$

where X and Y indicate the first public key and the second public key respectively, x and y indicate the secret keys, P indicates a generator of order p, and α indicates a randomly selected number from $\{0, 1, \ldots, p-1\}$.

In operation S1020, a random public key is generated. For example, random public key R=rP may be generated, where r indicates a number that is randomly selected from $\{0, 1, \ldots, p-1\}$ (i.e., r indicates a random secret key).

In operation S1030, a signature value is generated based on the secret keys and the random public key. For example, the signature value may be calculated by:

$$\sigma=(r+(c_1+\alpha c_2)(x+\alpha y)) \bmod p, (c_1, c_2)=H(m,R), \quad \text{[Equation 5]}$$

where σ indicates the signature value, r and α indicate numbers randomly selected from $\{0, 1, \ldots, p-1\}$, x and y indicate the secret keys, H indicates a hash function, m indicates a message, and R indicates the random public key.

In operation S1040, when the signature value with respect to the message is generated (operation S1030), an electronic signature with respect to the message is generated and then distributed to users. For example, the electronic signature may include $(c_1, c_2, \sigma)$.

FIG. 11 is a flowchart illustrating an example of a method of receiving and verifying a distributed electronic signature. Referring to FIG. 11, in operation S1110, distributed electronic signatures are received. For example, the distributed electronic signatures of (c1, c2, σ) may be received.

In operation S1120, when the distributed electronic signature is received (operation S1110), a first signature verification value is calculated based on the electronic signature, and a first public key and a second public key that are generated when generating the electronic signature. For example, the first signature verification value may be $H(m, \sigma P-c_1 X-c_2 Y)$.

In operation S1130, when the first signature verification value is calculated (operation S1120), whether the first signature verification value is identical to a predetermined verification determination value is determined. For example, the verification determination value may be $H(c_1, c_2)$.

In operation S1140, when it is determined that the first signature verification value is identical to the verification determination value (operation S1130), the received electronic signature is determined to be verified.

Conversely, in operation S1150, when it is determined that the first signature verification value is different from the verification determination value (operation S1130), the received electronic signature is determined to be unverified.

The key calculation method and the shared key generation method using the same according to aspects described above may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave including a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described teachings.

According to teachings above, there are provided a key calculation method and a shared key generation method using the same, which can perform either a coordinates operation or an exponentiation operation using two keys and thereby maintain security and improve a calculation processing speed.

Moreover, according to teachings above, there are provided a key calculation method and a shared key generation method using the same, which can generate a shared key through a key calculation function using two secret keys and two received public keys.

Furthermore, according to teachings above, there are provided a key calculation method and a shared key generation method using the same, which can provide a key calculation method that can improve a calculation processing speed with a relatively small amount of memory.

Although a few examples have been shown and described, it would be appreciated by those skilled in the art that changes may be made to these examples.

Accordingly, other implementations are within the scope of the following claims.

What is claimed is:

1. A method of calculating a key using a processor in a key calculation apparatus, the method comprising:
generating two keys using the processor;
calculating, using the processor, one or more first values based on coefficients having an identical coefficient value among coefficients included in each of the two keys, such that a first value is calculated for each coefficient value, excluding 0; and
performing, based on the calculating of the one of more first values, using the processor, one of a coordinates operation key calculation and a exponentiation operation key calculation,
wherein:
in the coordinates operation key calculation:
each of the two keys includes at most one coefficient, excluding 0, among a consecutive w number of coefficients, the at most one coefficient being an integer that has an absolute value of less than or equal to $q^w/2$ and is indivisible by q;
q is a prime number or a power exponent of the prime number;
w is a natural number greater than or equal to 2; and
the generating of the two keys comprises:
selecting, for each of the two keys, a t number of groups from an $m-(w-1)*(t-1)$ number of groups, where m and t are positive integers;
substituting each of the selected t number of groups with a string, the string listing a w−1 number of 0s and one or more integers that have an absolute value of less than or equal to $q^w/2$ and are indivisible by q; and
substituting an unselected group with 0; and
in the exponentiation operation key calculation:
each of the two keys includes at most one coefficient, excluding 0, among a consecutive w number of coefficients, the at most one coefficient being a positive odd number less than or equal to $2^w$;
w is a natural number greater than or equal to 2; and
the generating of the two keys comprises:
selecting, for each of the two keys, a t number of groups from an $m-(w-1)*t$ number of groups, where m and t are positive integers;
substituting each of the selected t number of groups with a string, the string listing a w−1 number of 0s and one or more positive odd numbers less than or equal to $2^w$; and
substituting an unselected group with 0.

2. A non-transitory computer readable recording medium encoded with the method of claim 1 and implemented by a computer.

3. A method of generating a shared key using a processor in a shared key generation apparatus, the method comprising:
generating two secret keys using the processor;
calculating, using the processor, a first public key based on the two secret keys, the calculating of the first public key comprising:
calculating one or more first values based on coefficients having an identical coefficient value among coefficients included in each of the two secret keys, such that a first value is calculated for each coefficient value included in the two secret keys, excluding 0; and
calculating the first public key by performing, based on the calculating of the one or more first values, one of a coordinates operation key calculation and an exponentiation operation key calculation;
calculating, using the processor, a second public key based on the first public key;
transmitting the first public key and the second public key to an apparatus;
receiving a third public key and a fourth public key generated by the apparatus; and
generating, using the processor, the shared key based on the two secret keys, the third public key, and the fourth public key,
wherein:
in the coordinates operation key calculation:
each of the two secret keys includes at most one coefficient, excluding 0, among a consecutive w number of coefficients, the at most one coefficient being an integer that has an absolute value of less than or equal to $q^w/2$ and is indivisible by q;
q is a prime number or a power exponent of the prime number;
w is a natural number greater than or equal to 2; and
the generating of the two secret keys comprises:
selecting, for each of the two secret keys, a t number of groups from an m−(w−1)*(t−1) number of groups, where m and t are positive integers;
substituting each of the selected t number of groups with a string, the string listing a w−1 number of 0s and one or more integers that have an absolute value of less than or equal to $q^w/2$ and are indivisible by q; and
substituting an unselected group with 0; and
in the exponentiation operation key calculation:
each of the two secret keys includes at most one coefficient, excluding 0, among a consecutive w number of coefficients, the at most one coefficient being a positive odd number less than or equal to $2^w$;
w is a natural number greater than or equal to 2; and
the generating of the two secret keys comprises:
selecting, for each of the two secret keys, a t number of groups from an m−(w−1)*t number of groups, where m and t are positive integers;
substituting each of the selected t number of groups with a string, the string listing a w−1 number of 0s and one or more positive odd numbers less than or equal to $2^w$; and
substituting an unselected group with 0.

4. The method as claimed in claim 3, wherein the calculating of the second public key comprises:
multiplying the first public key by a randomly selected value.

5. The method as claimed in claim 3, wherein the generating of the shared key comprises:
generating the shared key according to an equation: $x[1]X[2]+y[1]Y[2]$, where $x[1]$ and $y[1]$ are the two secret keys, $X[2]$ is the third public key, and $Y[2]$ is the fourth public key.

6. A non-transitory computer readable recording medium encoded with the method of claim 3 and implemented by a computer.

7. A key calculating apparatus including a processor, the apparatus comprising:
a key generation management unit configured to generate two keys using the processor;
a coefficient value calculator configured to calculate, using the processor one or more first values based on coefficients having an identical coefficient value among coefficients included in each of the two keys, such that a first value is calculated for each coefficient value, excluding 0; and
a key calculator configured to perform, based on the one or more first values, using the processor, one of a coordinates operation key calculation and an exponentiation operation key calculation,
wherein:
in the coordinates operation key calculation:
each of the two keys includes at most one coefficient, excluding 0, among a consecutive w number of coefficients, the at most one coefficient being an integer that has an absolute value of less than or equal to $q^w/2$ and is indivisible by q;
q is a prime number or a power exponent of the prime number;
w is a natural number greater than or equal to 2; and
the key generation management unit comprises:
a group selector configured to select, for each of the two keys, a t number of groups from an m−(w−1)*(t−1) number of groups, where m and t are positive integers;
a string substitution unit configured to substitute each of the selected t number of groups with a string, the string listing a w−1 number of 0s and one or more integers that have an absolute value of less than or equal to $q^w/2$ and are indivisible by q; and
a key generator configured to generate each of the two keys by substituting an unselected group with 0; and
in the exponentiation operation key calculation:
each of the two keys includes at most one coefficient, excluding 0, among a consecutive w number of coefficients, the at most one coefficient being a positive odd number less than or equal to $2^w$;
w is a natural number greater than or equal to 2; and
the key generation management unit comprises:
a group selector configured to select, for each of the two keys, a t number of groups from an m−(w−1)*t number of groups, where m and t are positive integers;
a string substitution unit configured to substitute each of the selected t number of groups with a string, the string listing a w−1 number of 0s and one or more positive odd numbers less than or equal to $2^w$; and
a key generator configured to generate each of the two keys by substituting an unselected group with 0.

8. A shared key generation apparatus using a processor, the apparatus comprising:
a key generation management unit configured to generate two secret keys using the processor;
a first calculator configured to, using the processor:
calculate a first public key based on the two secret keys by performing, based on one or more first values, one of a coordinates operation key calculation and an exponentiation operation key calculation; and
calculate the one or more first values based on coefficients having an identical coefficient value among coefficients included in each of the two secret keys, such that a first value is calculated for each coefficient value included in the two secret keys, excluding 0;
a second calculator configured to, using the processor, calculate a second public key based on the first public key;
a transmitting and receiving unit configured to:
transmit the first public key and the second public key to an other apparatus; and
receive a third public key and a fourth public key generated by the other apparatus; and
a shared key generator configured to, using the processor, generate the shared key based on the two secret keys, the third public key, and the fourth public key,
wherein:
in the coordinates operation key calculation:
each of the two secret keys includes at most one coefficient, excluding 0, among a consecutive w number of coefficients, the at most one coefficient being an integer that has an absolute value of less than or equal to $q^w/2$ and is indivisible by q;
q is a prime number or a power exponent of the prime number;
w is a natural number greater than or equal to 2; and
the key generation management unit comprises:
a group selector configured to select, for each of the two secret keys, a t number of groups from an $m-(w-1)*(t-1)$ number of groups, where m and t are positive integers;
a string substitution unit configured to substitute each of the selected t number of groups with a string, the string listing a w−1 number of 0s and one or more integers that have an absolute value of less than or equal to $q^w/2$ and are indivisible by q; and
a key generator configured to generate each of the two secret keys by substituting an unselected group with 0; and
in the exponentiation operation key calculation:
each of the two secret keys includes at most one coefficient, excluding 0, among a consecutive w number of coefficients, the at most one coefficient being a positive odd number less than or equal to $2^w$;
w is a natural number greater than or equal to 2; and
the key generation management unit comprises:
a group selector configured to select, for each of the two secret keys, a t number of groups from an $m-(w-1)*t$ number of groups, where m and t are positive integers;
a string substitution unit configured to substitute each of the selected t number of groups with a string, the string listing a w−1 number of 0s and one or more positive odd numbers less than or equal to $2^w$; and a key generator configured to generate each of the two secret keys by substituting an unselected group with 0.

9. The apparatus as claimed in claim 8, wherein the second calculator is further configured to calculate the second public key by multiplying the first public key by a randomly selected value.

10. The apparatus as claimed in claim 8, wherein the shared key generator is further configured to generate the shared key according to an equation: $x[1]X[2]+y[1]Y[2]$, where $x[1]$ and $y[1]$ are the two secret keys, $X[2]$ is the third public key, and $Y[2]$ is the fourth public key.

11. A system for securing transactions between apparatuses, the system comprising:
a first apparatus configured to, using a first processor, generate a first shared key based on two first secret keys, a third public key, and a fourth public key, the first apparatus comprising:
a first key generation management unit configured to, using the first processor, generate the two first secret keys;
a first calculator configured to, using the first processor:
calculate a first public key based on the two first secret keys by performing, based on or more first values, one of a coordinates operation key calculation and an exponentiation operation key calculation; and
calculate the one or more first values based on coefficients having an identical coefficient value among coefficients included in each of the two first secret keys, such that a first value is calculated for each coefficient value included in the two secret keys, excluding 0;
a second calculator configured to, using the processor, calculate a second public key based on the first public key;
a first transmitting and receiving unit configured to:
transmit the first public key and the second public key to a second apparatus; and
receive the third public key and the fourth public key from the second apparatus; and
a first shared key generator configured to generate the first shared key based on the two first secret keys, the third public key, and the fourth public key; and
the second apparatus configured to, using a second processor, generate a second shared key based on two second secret keys, the first public key, and the second public key, the second apparatus comprising:
a second key generation management unit configured to, using the second processor, generate the two second secret keys;
a third calculator configured to, using the second processor:
calculate a third public key based on the two second secret keys by performing, based on or more second values, one of the coordinates operation key calculation and the exponentiation operation key calculation; and
calculate the one or more second values based on coefficients having an identical coefficient value among coefficients included in each of the two second secret keys, such that a second value is calculated for each coefficient value included in the two second secret keys, excluding 0;
a fourth calculator configured to calculate, using the second processor, the fourth public key based on the third public key;

a second transmitting and receiving unit configured to:
            transmit the third public key and the fourth public key to the first apparatus; and
            receive the first public key and the second public key from the first apparatus; and
        a second shared key generator configured to, using the second processor, generate the second shared key based on the two second secret keys, the first public key, and the second public key,
wherein:
    in the coordinates operation key calculation:
        each of the two first secret keys and each of the two second secret keys respectively include at most one coefficient, excluding 0, among a consecutive w number of coefficients, the at most one coefficient being an integer that has an absolute value of less than or equal to $q^w/2$ and is indivisible by q;
        q is a prime number or a power exponent of the prime number;
        w is a natural number greater than or equal to 2; and
        the first and second key generation management units respectively comprise:
            first and second group selectors respectively configured to select, for each of the two first secret keys and each of the two second secret keys, a respective t number of groups from an m−(w−1)*(t−1) number of groups, where m and t are positive integers;
            first and second string substitution units respectively configured to substitute each of the selected respective t number of groups with a string, the string listing a w−1 number of 0s and one or more integers that have an absolute value of less than or equal to $q^w/2$ and are indivisible by q; and
            first and second key generators respectively configured to generate each of the two first secret keys and each of the two second secret keys by substituting unselected groups with 0;
    in the exponentiation operation key calculation:
        each of the two first secret keys and each of the two second secret keys respectively include at most one coefficient, excluding 0, among a consecutive w number of coefficients, the at most one coefficient being a positive odd number less than or equal to $2^w$;
        w is a natural number greater than or equal to 2; and
        the first and second key generation management units respectively comprise:
            first and second group selectors respectively configured to select, for each of the two first secret keys and each of the two second secret keys, a respective t number of groups from an m−(w−1)*t number of groups, where m and t are positive integers;
            first and second string substitution unit respectively configured to substitute each of the selected respective t number of groups with a string, the string listing a w−1 number of 0s and one or more positive odd numbers less than or equal to $2^w$; and
            first and second key generators respectively configured to generate each of the two first secret keys and the two second secret keys by substituting unselected groups with 0; and
    a transaction between the first apparatus and the second apparatus is secure if the first shared key is identical to the second shared key.

12. The system as claimed in claim 11, further comprising:
a third apparatus configured to transmit the two first secret keys, the first public key, and the second public key to the first apparatus.

13. The system as claimed in claim 11, further comprising:
a third apparatus configured to transmit the two second secret keys, the third public key, and the fourth public key to the second apparatus.

* * * * *